April 25, 1933. L. BACQUEYRISSE 1,905,428
ELECTRIC TRACTION SYSTEM EMPLOYING COMPOUND MOTORS
Filed Jan. 24, 1930 2 Sheets-Sheet 2
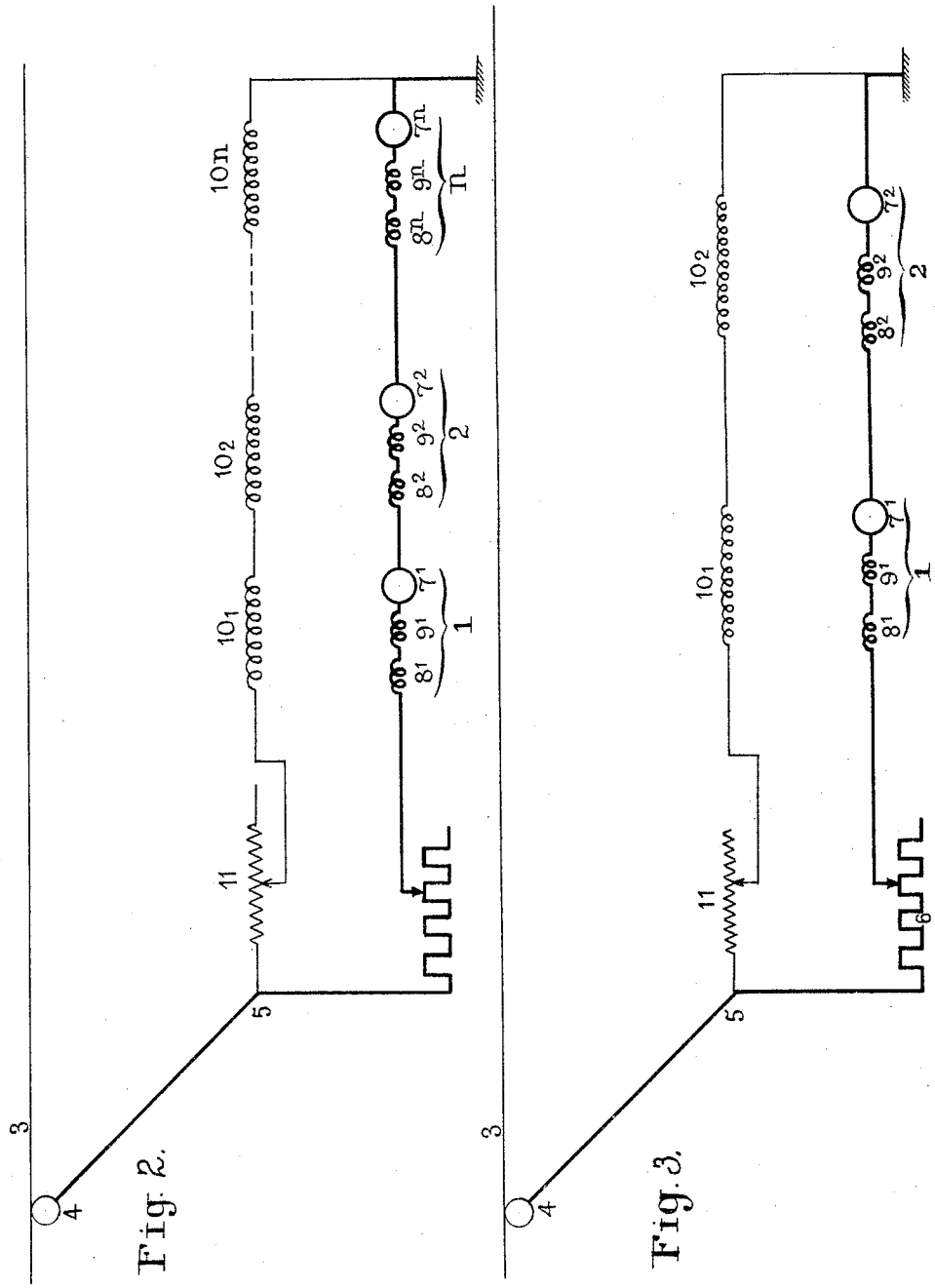
INVENTOR
Louis Bacqueyrisse
by
Attorney Patented Apr. 25, 1933

1,905,428

UNITED STATES PATENT OFFICE

LOUIS BACQUEYRISSE, OF PARIS, FRANCE

ELECTRIC TRACTION SYSTEM EMPLOYING COMPOUND MOTORS

Application filed January 24, 1930, Serial No. 423,093, and in France October 8, 1929.

The present invention relates to improvements in systems of electric traction with regeneration employing compound motors.

The object of the present invention is to provide a system of this type which will decrease the losses in the starting rheostats, which will be economical in operation at a slow and constant speed, which will give a higher percentage of recovery of power on down grades or when slowing down or stopping, and an increased range of running speeds, together with a considerable reduction in the weight of the mechanism used for controlling the motors.

The use of compound electric railway motors supplied with continuous current and adapted for the regeneration of power on down grades and when slowing down or stopping has heretofore been limited to the use of heavy and complicated apparatus, because of the difficulties present in the use of such motors.

The usual control of the speed by a series-parallel coupling of the motors requires, in the case of compound motors, that the power circuits be broken during the transfer from series to parallel, in order to avoid any operation of the compound motor as a generator when it is thus momentarily short circuited. However, this produces a break in the tractive forces which is damaging to the train and uncomfortable to the passengers. In addition, a rather complicated apparatus must be used to avoid the harmful effects of the breaking of the circuits and to prevent an excessive rush of current at the time the said transfers take place.

When the motors are operating in parallel, especially with the reduced field, it is practically impossible to distribute the load equally between the different motors. With a weak field, commutator poles can be used which will cause the motor to run smoothly in one direction; but the operation will not be as smooth in the opposite direction, which causes difficulties such as sparking or flashing. On the other hand, it is difficult to provide shunt fields which operate on the total tension. Certain known devices partly obviate these difficulties, but only by the use of large, heavy and complicated constructions.

Other devices use both series and shunt windings, for very different purposes. The shunt winding is used merely for normal running and for regenerative breaking, while the series winding is normally short circuited during running and is used separately and momentarily for starting, for emergency breaking, and to protect the motors during the transfer from series to parallel operation. In addition, a shunt winding only has been used for regeneration, but such a construction cannot possibly produce a steady and smooth operation of the motors. Finally, a traction system has been used having its motors in series, with controllers to regulate the fields so as to reduce the consumption of current. Such controllers are heavy and require many conductors or leads, this producing a loss of power with increased weight.

According to the present invention, all these disadvantages are avoided by the use of special compound motors in which the series field windings as well as the armature and commutation windings are permanently connected in series and are supplied by the normal tension of the line except during the starting period when resistances are inserted. In addition, the shunt field windings are connected in series on the normal tension of the line, with a rheostat for regulating the field. With such an arrangement it is possible to obtain a large range of varied speeds by merely regulating the excitation of the shunt windings, thereby varying the shunt field. This gives a substantially constant tractive force during the starting and normal running, and a continuous braking force during regeneration. In addition, the load is distributed equally between the different motors automatically. The motors can be constructed in the most suitable and economical form, because the tension in the terminals of the windings of each motor and of the collector is much less than usual, whereby the collectors operate without sparking or flashing.

In addition, the system is far less complicated as far as the conductors and controllers are concerned than the usual series-parallel systems. The motors are designed to afford a strong field at maximum shunt excitation and a large range of speed by the mere regulation of the shunt field. The torque at starting is high and may be substantially constant. The loss in the rheostats may be reduced by the use of fewer contacts for the resistances used to control the motors. The vehicle may be run at a slow and constant speed without the use of resistance between the line and the motors, thereby increasing the efficiency. The system therefore gives the usual range of speeds without resorting to a series-parallel arrangement. It gives a high percentage of regeneration even at slow speeds. It makes it possible to reduce considerably the number and weight of the cables or conductors leading to the terminals or contacts of the resistances.

The improved results are obtained by completely saturating the motors during starting by using a very large number of field ampere turns in series and in shunt. The ratio between the armature and field ampere turns depends upon local conditions. In order to obtain the desired range of speed by the mere regulation of the excitation of the shunting windings, the motors are designed to reduce the distortions due to a transverse field while providing for the proper operation of the motors in non-saturated condition without sparking or flashing of the commutator and without increasing the tension between the collector blades.

The features of design of the motors include a high ratio between the ampere turns in the field and armature windings, a large air gap, suitably shaped pole-pieces, and the use of compensating or commutator poles, and of a large number of collector blades.

In the drawings:

Figs. 2 and 3 show diagrammatically two applications of the invention to a vehicle.

Figure 1:
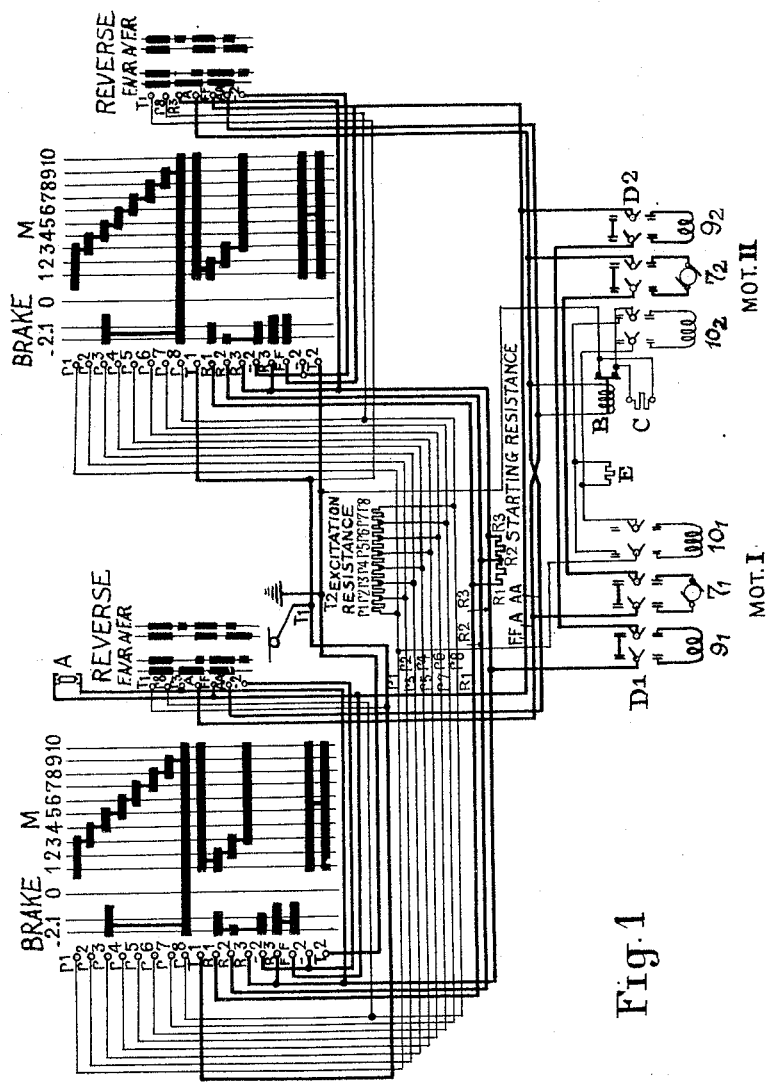
Fig. 1 shows one form of the system for a car having two separated controlling devices.

In Fig. 1 are shown two controllers M for the motors, each of these controllers having 13 positions of which position 0 is neutral, positions 1 to 10 are for use in normal forward running and for regenerative braking, and positions −1, −2 are for use during rheostatic braking, that is to say, for braking without regeneration when the speed has been reduced to a given value for which the regeneration is impossible. This braking, with the type of motor used, does not require the inversion of the armature windings with respect to the field windings as is usual in the ordinary series motors.

In Fig. 1, the power network is shown in heavy lines while the shunt excitation wires and connecting wires are shown in light lines.

A relay B and a resistance C are provided in the shunt excitation circuit, the resistance acting to limit any excess voltage which may occur during regeneration.

Two groups of switches D1 and D2 make it possible to switch out the armature and field windings of any motor which may become inactive for any reason, thereby permitting the total current to pass to the other motor. In the shunt windings, however, the operation of these switches automatically connects the resistance E in the circuit, the resistance of this member being substantially equal to the resistance of the shunt windings of the motor. In this way, the current in the shunt windings remains unchanged.

An interlocking connection (not shown) is provided between the switches D1, D2 and the contact elements on the controller in order to prevent the shunt windings from becoming reduced when the switches are operated.

As is obvious from the drawings, the field and armature windings are always connected in series to the main line while the motors are in operation. In the first two positions of the controller, that is, during starting, resistances $R_1$ and $R_2$ are placed in the series connection, as is usual. These resistances are also used during rheostatic braking. For the shunt field, resistances $r1$ to $r8$ are automatically cut in by the controller to vary the shunt field and thereby to control the field.

In the forms shown in Figs. 2 and 3, 1, 2 and $n$ represent the motors, having armature windings $7^1$, $7^2$, $7^n$, field windings $8^1$, $8^2$, $8^n$, and commutation windings $9^1$, $9^2$, $9^n$. The shunt windings $10^1$, $10^2$, $10^n$ are likewise arranged in series, together with rheostats 11. Current is supplied by a line 3 through the contact member 4, 5 to the motors and to the shunt windings. A starting resistance 6 is also provided.

The only distinction between Figs. 2 and 3 is that Fig. 3 shows the device supplied with two motors while Fig. 2 shows the use of any desired number $n$ of motors.

While I have described herein some embodiments of my invention, I wish it to be understood that I do not intend to limit myself thereby except within the scope of the appended claim.

I claim:

The method of operating a plurality of compound-wound motors in a system of regenerative electric traction which consists in connecting the armature windings and series field windings in series across the power mains, connecting the shunt field windings in series across said power mains, maintaining said connections during starting, normal operation, and regenerative braking, and controlling the speed of said motors during said operations solely by varying the shunt excitation.

In testimony whereof I have hereunto set my hand at Paris this tenth day of January 1930.

LOUIS BACQUEYRISSE.